(12) United States Patent
Call et al.

(10) Patent No.: US 10,643,669 B2
(45) Date of Patent: May 5, 2020

(54) PARALLEL TESTING OF MAGNETIC RECORDING SLIDERS

(71) Applicant: Western Digital Technologies, Inc., San Jose, CA (US)

(72) Inventors: David E. Call, Folsom, CA (US); Mike Wang, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 16/370,516

(22) Filed: Mar. 29, 2019

(65) Prior Publication Data

US 2019/0392869 A1 Dec. 26, 2019

Related U.S. Application Data

(60) Provisional application No. 62/688,884, filed on Jun. 22, 2018.

(51) Int. Cl.
| | |
|---|---|
| *G11B 27/36* | (2006.01) |
| *G11B 5/48* | (2006.01) |
| *G11B 5/09* | (2006.01) |

(52) U.S. Cl.
CPC .......... *G11B 27/36* (2013.01); *G11B 5/09* (2013.01); *G11B 5/4826* (2013.01)

(58) Field of Classification Search
CPC .......... G11B 5/455; G11B 5/4555; G11B 2005/0016; G11B 5/3166; G11B 27/36; G11B 5/012; H01L 43/00; H01L 43/06; H01L 43/08; G01R 33/098; G01R 33/12; G01R 33/1215; G01R 33/1253; G01R 33/14; G01R 33/077; G01R 33/00; G01R 33/091; G01R 33/95; G01R 33/72
USPC ........ 360/31, 97.12, 135, 246.1, 294.4, 313, 360/234.5; 324/210, 262, 252, 234, 212, 324/750.03, 750.04
See application file for complete search history.

(56) References Cited

U.S. PATENT DOCUMENTS

| | | | |
|---|---|---|---|
| 7,564,236 B1 | 7/2009 | Call et al. | |
| 8,040,131 B2 | 10/2011 | Call et al. | |
| 9,099,107 B1 * | 8/2015 | Igarashi | A61M 16/0045 |
| 9,387,568 B1 | 7/2016 | Ilaw et al. | |
| 9,454,981 B1 * | 9/2016 | Call | G11B 5/4886 |
| 9,870,788 B2 | 1/2018 | Miranda et al. | |
| 9,881,639 B2 | 1/2018 | Davis et al. | |

* cited by examiner

*Primary Examiner* — Nabil Z Hindi
(74) *Attorney, Agent, or Firm* — Barry IP Law, P.C.

(57) ABSTRACT

A magnetic recording slider test system includes a host to collect test results and initiate concurrent testing of a plurality of magnetic recording sliders. Each of a plurality of first processing units is configured to test at least one element of a respective magnetic recording slider. In one aspect, the plurality of first processing units concurrently tests at least one element of respective magnetic recording sliders. In another aspect, a plurality of first signals is analyzed at respective first processing units, with each of the first signals representing a Direct Current (DC) output from one or more elements of a magnetic recording slider. Results determined from analyzing the first signals are sent to the host. In another aspect, a plurality of second processing units is configured to analyze second signals that each represent an Alternating Current (AC) output from one or more elements of the plurality of magnetic recording sliders.

24 Claims, 7 Drawing Sheets

PARALLEL TESTING OF MAGNETIC RECORDING SLIDERS

CROSS-REFERENCE TO RELATED APPLICATION

This application claims the benefit of U.S. Provisional Application No. 62/688,884, entitled "METHOD AND STRUCTURE FOR PARALLEL TESTING OF MULTIPLE READ HEADS", filed on Jun. 22, 2018, which is hereby incorporated by reference in its entirety.

BACKGROUND

Data storage devices can employ various forms of magnetic media, such as rotating magnetic disks in Hard Disk Drives (HDDs) and moving magnetic tapes in tape drives. In an HDD, for example, data is written to a disk using a write coil element or write head on a slider that generates a high localized magnetic field which aligns magnetic domains within the disk in one of two directions. In some cases, the magnetization direction is up or down relative to the plane of the disk (i.e., Perpendicular Magnetic Recording (PMR)). In other cases, the magnetization direction is within the plane of the disk. Data may then be read with a Magneto-Resistance (MR) read element or read head. The write and read heads are typically integrated within a single assembly or slider.

As part of the manufacturing process of a slider, the electrical and magnetic performance of the fabricated slider where the heads reside is measured with a quasi-static ("quasi") tester. Conventionally, testing is done on one or two sliders at a time. For newer technology sliders with more elements, such as sliders used to support Two-Dimensional Magnetic Recording (TDMR) or various energy-assisted recording technology, such as Heat Assisted Magnetic Recording (HAMR) or Microwave Assisted Magnetic Recording (MAMR), the slider test time is slower due to the need to test additional elements of each slider. In the future, it is projected that the volume of components for sliders will dynamically increase, resulting in additional tester capacity required to meet volume needs. The costs can be significant to support this increased need for testing capacity, including building space and capital for purchase of additional testing equipment.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example Magnetic Recording Slider Test Systems

Magnetic recording slider test systems of the present disclosure provide various structures and methods for parallel or simultaneous testing of magnetic recording sliders, such as quasi testing of such sliders, to significantly improve testing time. As described in more detail below, quasi testing can include, among other evaluations, determining bias currents, bias voltages, or resistances for elements of the slider, such as one or more Magneto-Resistance (MR) reader elements, a write coil element, one or more Thermal Fly-Height Control (TFC) elements, a Spin Torque Oscillator (STO) element, one or more Embedded Contact Sensor (ECS) elements, one or more Inter Voltage Control (IVC) elements, and a laser element. The testing can include other signal to noise, instability, and performance characterization evaluations. As will be appreciated by those of ordinary skill in the art, sliders may include different elements or only include a subset of the foregoing slider elements.

MR reader elements can include a magnetic sensor located on a slider for detecting a magnetic field on a disk. The MR reader elements, (i.e., read heads or read transducers) may comprise any type of sensor as will be apparent to one of ordinary skill in the art. One type of conventional MR reader element used in Hard Disk Drives (HDDs) is a spin valve sensor based on the Giant MR (GMR) effect. A GMR spin-valve sensor has a stack of layers that includes two ferromagnetic layers separated by a nonmagnetic electrically conductive spacer layer, which is typically copper. Another type another type of MR reader element is a magnetic tunnel junction sensor, also called a tunneling MR or TMR sensor, in which the nonmagnetic spacer layer is a thin non-magnetic tunneling barrier layer. A third type of MR reader element is a scissor sensor which, in contrast to GMR and TMR sensors, has two or more free layers.

Write coil elements can include an inductive write portion that includes a coil layer embedded in one or more insulation layers (insulation stack), the insulation stack being located between first and second pole piece layers. A gap may be formed between the first and second pole piece layers by a gap layer at an Air Bearing Surface (ABS) of the write portion. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on media, such as in tracks on a rotating magnetic disk.

The second pole piece layer can have a pole tip portion which extends from the ABS to a flare point and a yoke portion which extends from the flare point to the back gap. The flare point is where the second pole piece begins to widen (flare) to form the yoke. The placement of the flare point can directly affect the magnitude of the magnetic field produced to write data on the recording medium.

As the areal density of disks increase (e.g., an increase in Tracks Per Inch (TPI)), a fly-height of the slider or the distance between the slider and the disk surface typically decreases to be able to read and write data in smaller or narrower tracks on the disk. For example, many modern HDDs may have a fly-height of only several nanometers. At such relatively small distances, control of the fly-height becomes more important for avoiding errors when writing and reading data due to variations in the fly-height. In many cases, the fly-height can change when a write current used to write data on the disk causes part of a slider including the write coil or write head to heat up and expand or protrude toward the disk, while reading data may not cause a similar type of heating and expansion toward the disk.

In order to provide a more consistent fly-height when reading and writing data, some recent DSDs include one or more TFC elements on the slider that can act as resistance heaters to cause a bottom surface of the slider to thermally expand or protrude closer to the disk surface when the TFC element is on, and cause the bottom surface of the slider to retract away from the disk when the TFC element is off. The turning on of the TFC element may then be controlled with the writing and reading of data on the disk to provide a more consistent fly-height. For example, before writing data, a TFC element may be turned on at a high-power to preheat the slider and then the power may be reduced as writing begins so that the fly-height of one or more MR reader elements remain relatively the same with the heating provided by the write current during the write process. Before reading data, one or more TFC elements may be turned on to a high power to preheat the slider before reading and then left at the high power to maintain relatively the same fly-height throughout the read process.

Some sliders may include an STO element for Microwave Assisted Magnetic Recording (MAMR). MAMR uses an STO element on the slider to generate a microwave field that allows a magnetic medium, such as a rotating magnetic disk, to be more easily magnetized with a lower magnetic field so that a higher storage density can be achieved.

ECS elements can include a thermal sensor embedded in the slider to detect, for example, contact between the slider and a disk surface. In some cases, an ECS element can be used to detect spacing variation between the slider and the disk surface, such as due to pitting on the disk surface or the accumulation of particles, such as disk lubricant on the slider.

IVC elements can include control for adjusting a voltage bias for the slider body. The adjustment in voltage bias of the slider can improve the interaction between the slider ABS and the surface of a disk so that there is less friction between the two surfaces and less particles accumulated on the slider. The decreased distance or fly-height between the disk and the slider in modern HDDs can cause increased friction or wear on the slider. A lowered fly-height can also increase the accumulation of disk lubricant or other particles on the slider due to forces from air pressure, electrostatic forces, and/or intermolecular forces. Such accumulation of lubricant or particles on the head can interfere with the reliable reading or writing of data by the head. The use of an IVC element can ordinarily bias the slider body to decrease electrostatic forces that can cause the accumulation of disk lubricant or other particles on the slider.

Heat Assisted Magnetic Recording (HAMR) uses a waveguide and a laser element, such as a laser diode, on the slider to heat a small region of a magnetic rotating disk that is to be written by a write coil element. The heating of the disk temporarily lowers the coercivity of grains in the disk to allow the grains to become magnetized by the write coil element, before returning to a higher coercivity after cooling off. This allows the use of smaller grains (and thus a higher storage density) that require a higher coercivity to remain magnetized after being written due their smaller size.

In order to enable shorter test times for the various elements of a slider, it is desirable to move to a high level of parallel testing. However, there are several technical challenges in testing a large number of sliders at the same time. For example, concurrently testing a large number of sliders can create a processing bottleneck at the host, which analyzes the data and produces test results. As more sliders or Devices Under Test (DUTs) are added, performance decreases due to this bottleneck. In more detail, many measurement algorithms may require adjustment of bias levels before data can be collected, collection of data while various stimulus conditions are applied, and use of complex algorithms to extract reported parameters (e.g., signal amplitude, signal asymmetry, kink, Segmented Sigma Noise (SSN)), which can also include various statistical values for each parameter. Some measurements can involve a large number of data points (e.g., SSN a with half million data points). This all places a very heavy load on the host's processing ability and limits the ability to scale to large parallel testing.

Various implementations of the testing systems in this disclosure can use low cost, processing units, such as Single Board Computers (SBCs) or Field Programmable Gate Arrays (FPGAs) with one processing unit for one or more elements of each slider or DUT being tested. This arrangement ordinarily allows for separation of higher-level evaluation at the host for all of the concurrently tested DUTs (e.g., pass or fail), and more computationally demanding processing at the processing unit level for analysis and measurement algorithms. In some implementations, the testing system can further include a second plurality of processing units for concurrently evaluating different outputs from the DUTs. In some implementations, each processing unit may support algorithms written in different programming languages.

Common operations to all DUT's can be performed by the host. In contrast, operations that are specific to each DUT being tested, such as measurement algorithms, can be performed by a processing unit dedicated to the DUT. For example, in the case of testing magnetic recording sliders, the host can execute code for a Graphical User Interface (GUI), motion control of the magnetic recording sliders, adjustment of the mechanical position of sliders, defect mapping, optical character recognition such as for reading a serial number of a particular slider, control of a magnetic stimulus for all sliders, a test sequence, reporting results, and communication with a database (e.g., saving test results collected from processing units).

Figure 1:
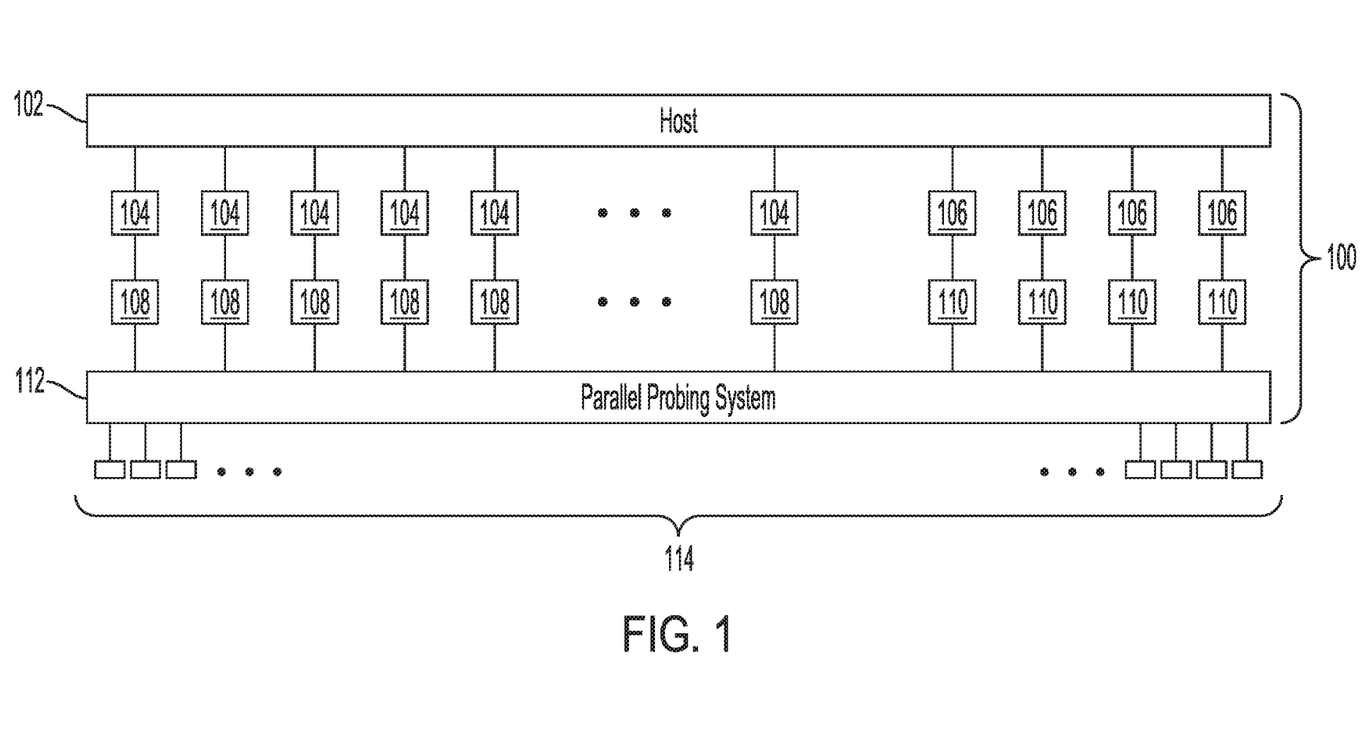
FIG. 1 is a high-level block diagram of a magnetic recording slider test system according to an embodiment.

FIG. 1 is a high-level block diagram of an example magnetic recording slider test system 100 for concurrently testing magnetic recording sliders 114 according to an embodiment. As shown in the example of FIG. 1, magnetic recording slider test system 100 includes host 102, first processing units 104, second processing units 106, data acquisition units 108, scope cards 110, and parallel probing system 112. Host 102 can include, for example, a computer such as a desktop or laptop that provides a user interface and a high level of control. In some implementations, host 102 can control the loading of sliders 114 into parallel probing system 112 and the reporting of final results to a user interface and/or database.

First processing units 104 can include, for example, SBCs such as Raspberry Pi SBCs, which execute an operating system (e.g., Linux OS) and execute software to perform particular testing algorithms and calculations. In other implementations, first processing units 104 can include, for example, FPGAs.

Similarly, second processing units 106 can include SBCs or FPGAs, but differ from first processing units 104 in that each second processing unit 106 tests one or more elements for a group of sliders 114, while each first processing unit 104 is dedicated to testing one or more elements from a single slider 114. In addition, and as discussed in more detail below, first processing units 104 may be used for Direct Current (DC) measurements or signals, while second processing units 106 may be used for Alternating Current (AC) measurements or signals.

Data acquisition units 108 can include, for example, analog circuitry for acquiring data from parallel probing system 112. In some implementations, each data acquisition unit 108 can receive one or more DC signals corresponding to respective elements of the dedicated slider 114.

Scope cards 110 can include, for example, circuitry that converts signals received from parallel probing system 112 into data for a respective second processing unit 106. In some implementations, each scope card 110 can receive multiple AC signals corresponding to respective elements of multiple sliders 114, such as filtered and/or amplified signals from MR read elements that have been subjected to a common magnetic field controlled by host 102. Each scope card may have multiple channels for each of the different signals, such as eight, six, or four channels.

In some implementations, parallel probing system 112 may include connections for up to 60 sliders for concurrent testing, which may correspond to a row bar size that is sliced out of a wafer during fabrication of the sliders such that the individual sliders do not need to be cut from the row before testing. In such implementations, sliders may be tested while they are still included in the row bar, thereby making the handling and probing of various parts easier than when the row bar is cut into individual sliders. In addition, testing sliders when they are still in a row bar can make it easier to simultaneously apply an external magnetic field to all the sliders.

Parallel probing system 112 can include, for example, a nest or test fixture that holds the sliders during testing and connects probe wires in parallel probing system 112 to pads or contacts on each slider for the different elements of the slider. Electrical contact with the pads for the elements may, for example, be made using Micro-Electro-Mechanical Systems (MEMS) technology. The sliders or a group of sliders, such as a row bar of sliders, may be loaded into the test fixture using a robotic pick and place device, which may be controlled by host 102.

Figure 2:
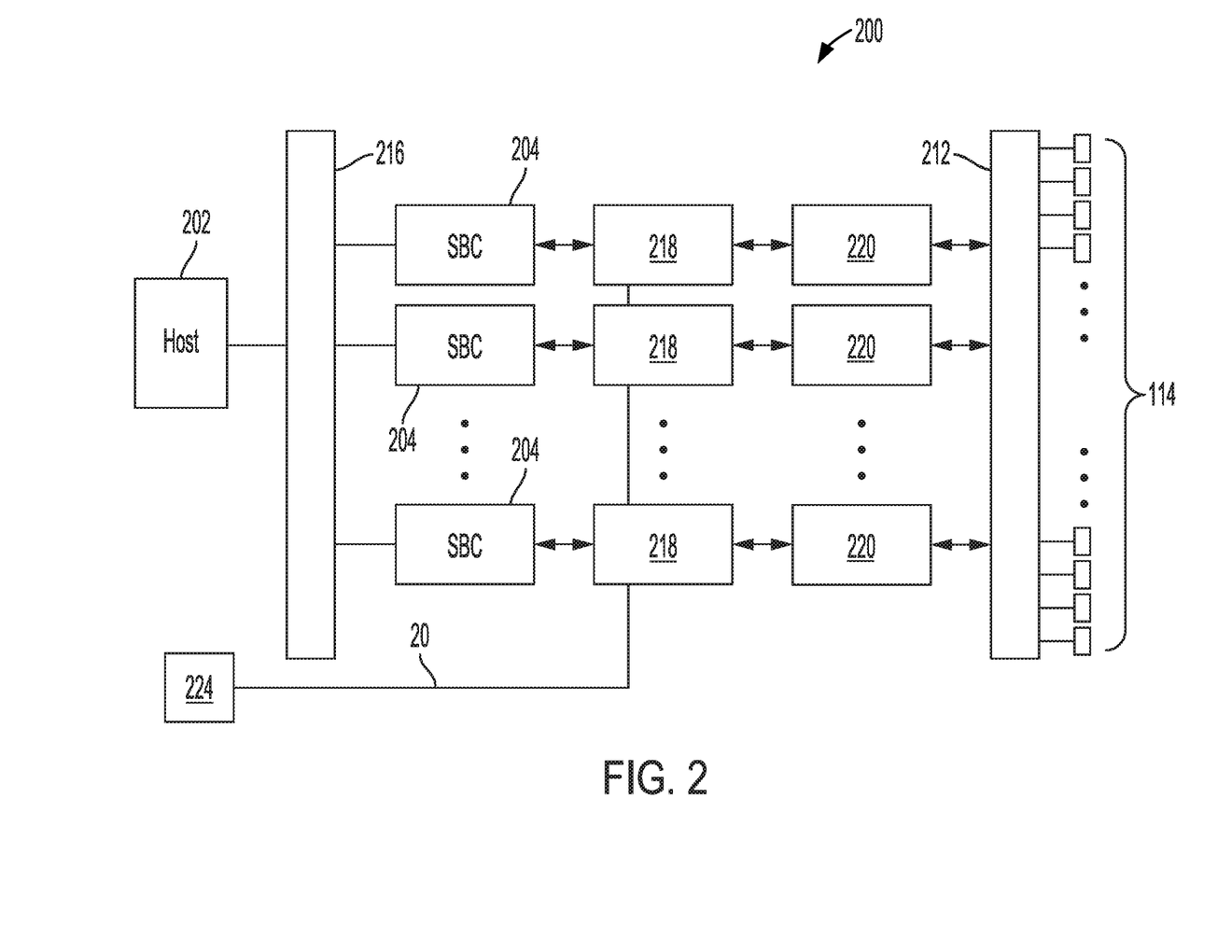
FIG. 2 is a block diagram of a magnetic recording slider test system including a plurality of Single Board Computers (SBCs) according to an embodiment.

FIG. 2 is a block diagram of magnetic recording slider test system 200 including a plurality of SBCs 204 according to an embodiment. As shown in FIG. 2, test system 200 includes host 202, Local Area Network (LAN) 216, magnet controller 224, SBCs 204, circuitry 218, analog electronics 220, and parallel probing system 212. As in the example discussed above with respect to FIG. 1, parallel probing system 212 connects a plurality of first processing units (i.e., SBCs 204) to a plurality of magnetic recording sliders (i.e., sliders 114) for parallel testing of the plurality of magnetic recording sliders. In the example of FIG. 2, each SBC 204 is dedicated to a particular slider 114 being tested. This ordinarily allows for the analysis and calculations involved in testing elements of the sliders to be offloaded from host 202 and improves the testing time of sliders 114 by allowing for parallel or simultaneous analysis and/or calculations for different elements on different sliders. This can remove the bottleneck at the host in terms of processing time and allows for scalability to test many sliders at the same time. The processing units can implement real time measurement and calculation of results. This can be scaled to a high number of DUTs (e.g., sliders) with little impact on overall system performance, as only summarized results may be returned host 202, which no longer needs to perform post-processing.

As shown in FIG. 2, analog electronics 220 connects to parallel probing system 212 and to circuitry 218. Analog electronics 220 can include, for example, sense circuits and bias circuits (e.g., sense circuits 330 and bias circuits 328 in FIG. 3) for measuring and biasing analog signals provided to and received from elements on sliders 114 via probe wires of parallel probing system 212. Analog electronics 220 can also include, for example, switches such as relays, amplifiers, pre-amplifiers, resistors, and diodes for manipulating the analog signals provided to and received from the elements.

Circuitry 218 can include, for example, Digital to Analog Converters (DACs) and Analog to Digital Converters (ADCs) connected to digital outputs and digital inputs, respectively, of SBCs 204. In this regard, SBCs 204 can test sliders 114 by providing test signals and receiving test data via circuitry 218 and analog electronics 220.

SBCs 204 can include a miniature or small compute device on a single Printed Circuit Board (PCB). In this regard, SBCs 204 can include all of the processing and memory functions of a full-sized computer on a single PCB, such as one or more processors (e.g., a microprocessor, a Digital Signal Processor (DSP), or an Application Specific Integrated Circuit (ASIC)), memory (e.g., a Dynamic Random Access Memory (DRAM)), inputs, and outputs on a single PCB. In addition to having a smaller size than traditional computers such as a laptop or desktop computer, SBCs are also typically less expensive. Examples of recent SBCs include the Raspberry Pi module, the Intel Edison module, the Intel Galileo module, and the Arduino module.

In the example of FIG. 2, each of SBCs 204 connect to Local Area Network (LAN) 216 to provide network communication between host 202 and each SBC 204. As discussed above with reference to host 101 in FIG. 1, host 202 in FIG. 2 can include a desktop or laptop computer that provides functions that are common to all of sliders 114 being tested. Such common functions can include, for example, a user interface and a high level of control such as initiating testing of a type of element of sliders 114 (e.g., initiating simultaneous testing of all MR read elements of all of the sliders) or controlling the sequence of tests being performed on sliders 114. In some implementations, host 102 can control the loading of sliders 114 into parallel probing system 212 and reporting test results received from SBCs 204 to a database and/or user interface of host 202.

In this regard, host 202 can control activation of magnet control 224 that controls a magnetic field applied to sliders 114. In some implementations, parallel probing system 212 can include magnetic poles that generate a common magnetic field through each slider 114 to concurrently simulate the magnetic fields induced by a magnetic storage medium that the sliders will encounter during normal operation in a DSD, such as an HDD or tape drive. In some tests, the magnetic fields may be stronger or weaker than a specified field strength for normal operation to stress test the elements. The polarity and strength of the magnetic field can be determined by a current in a magnet coil of parallel probing system 112, which is regulated by host 202 via magnet controller 224. In addition, magnet controller 224 can provide a timing signal to circuitry 218 so that measurement electronics including analog electronics 220 can synchronize measurements with the applied magnetic field. In some implementations, magnet controller 224 may use a field ramp, which allows for the slider to be exposed to a wide range of magnetic field strengths within a range, at nearly equal amounts of time in a smooth manner.

As will be appreciated by those of ordinary skill in the art, other implementations may include a different arrangement of components than shown in the example of FIG. 2. For example, FIG. 1 includes the use of shared scope cards 110 and shared second processing units 106 for handling AC signals that may be related to noise testing. As another example, some or all of SBCs 204 may be replaced by a different type of processing unit, such as an FPGA. Although an FPGA can be reprogrammed in the field and may in some cases operate faster than an SBC, the use of SBCs for processing units in test system 200 generally offers a higher degree of flexibility due to the use of software or executable code that is executed by a processor of the SBC that can be more easily replaced or modified.

Figure 3:
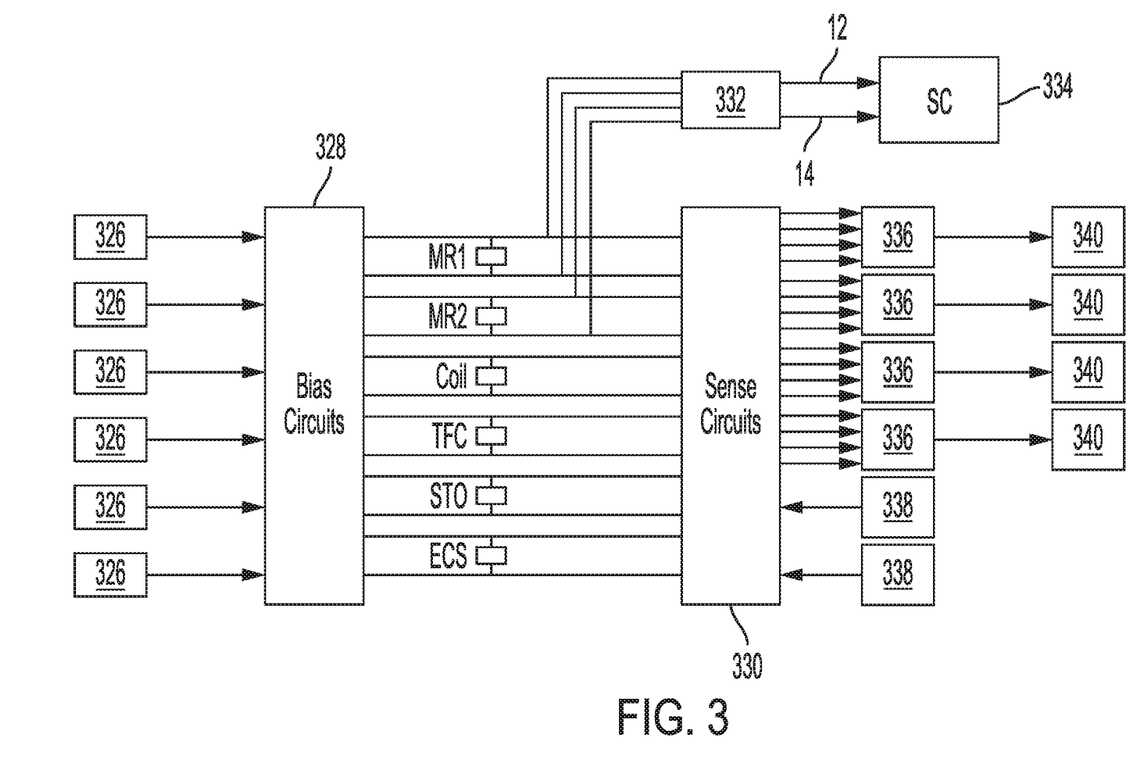
FIG. 3 illustrates a lower-level block diagram of a magnetic recording slider test system according to an embodiment.

FIG. 3 illustrates a lower-level block diagram of a magnetic recording slider test system according to an embodiment. In some implementations, some or all of the components shown in FIG. 3 with the exception of the slider elements (i.e., MR1, MR2, coil, TFC, STO, and ECS in FIG. 3) can form part of circuitry 218 and analog electronics 220 in FIG. 2 or the data acquisition units 108 in FIG. 1.

The arrangement of FIG. 3 represents a portion of the parallel testing system for testing a single slider with six elements. The portion of the testing system shown in FIG. 3 is repeated to scale for each slider tested in parallel, such as for two, five, ten, fifteen, sixty, or any number of sliders. As will be appreciated by those of ordinary skill in the art, other implementations can include a different arrangement of components than shown in FIG. 3. For example, other test systems may test a different number of elements per slider such that the number of DACs, ADCs, and switches vary.

For quasi electrical testing of a slider, many different electrical measurements are made of the different electrical elements that are contained in the slider. These may include, for example, resistance measurements of the different elements, measurements representing how the elements behave under different bias conditions, and measurements representing the behavior of the elements when subjected to an externally applied magnetic field. For MR1 and MR2, which are designed to sense the changes in magnetic field from a disk surface in operation, measurements can include signal integrity measurements, such as an amplitude and asymmetry of a read signal, linearity or transfer curve measurements, and noise measurements for SNR (Signal to Noise Ratio) and reader instability characterizations, such as SSN and the variation in noise over time in different conditions. These measurements may also be taken at different temperature conditions, read back frequencies, and/or magnetic field strengths. Examples of different tests, analysis, and calculations performed by the processing units are discussed in more detail below with reference to the test processes of FIGS. 6 and 7.

To make electrical measurements of the slider elements in FIG. 3, a bias such as a DC voltage or current can be applied by bias circuits 328. To control the bias level, a separate DAC 326 is used for each element. Many times, a symmetrical bias around ground can be applied (e.g., +/−1 volt). The bias currents can produce a desired symmetrical bias and can provide an appropriate drive capability.

To measure the response of the slider element, sense circuits 330 are used to sense the response, such as a voltage and/or a current. In many cases, a differential signal is measured across different element leads or pads. To reduce the number of ADCs 340 or data acquisition channels needed, switches 336 are used to select which signal each ADC is sampling for each specific test or type of measurement. In some implementations, switches 336 can include programmable flexible multipliers (e.g., multiplexers) or analog switches. In other implementations, switches 336 may not be used to select a signal to be used for testing or analysis. In such implementations, additional sense circuitry (e.g., filters, amplifiers and ADCs) may be needed to provide the signals to the processing units in the test system.

As shown in FIG. 3, six DACs 326 provide different analog outputs from a processing unit (e.g., an SBC 204 in FIG. 2) to control bias levels to the elements in a slider via bias circuits 328. In the example of FIG. 3, the tested elements include MR reader elements (MR1, MR2), a write coil element, a TFC element, an STO element, and an ECS element. Sense circuits 330 measure analog responses or signals that can include a current and voltage for each element. The responses are provided to switches 336 that select a signal to provide to a respective ADC 340 based on a measurement algorithm. In some implementations, switches 336 can include a multiplexer (MUX).

The digital signals output from the ADCs are provided to a single processing unit assigned or dedicated to the slider being tested (e.g., an SBC 204 in FIG. 2). In the example of FIG. 3, the outputs from each of MR1 and MR2 are provided to preamplifier 332, which provides signal 12 for MR1 and signal 14 for MR2 to scope card 334. In some implementations, preamplifier 332 can include an anti-aliasing filter to restrict the bandwidth of the signal to a frequency range of interest. In other implementations, such a filter may be included as part of scope card 334 or as a separate component before scope card 334.

Scope card 334 can include a digitizer with multiple channels and a high sampling rate. For example, scope card 334 may include two to eight channels and may have a maximum sampling rate of 25 million samples per second to 4 billion samples per second, and an 8 bit, 14 bit, or 16 bit resolution. Scope card 334 can include an on-board memory and may connect to a second processing unit using, for example, an Ethernet connection or other type of connection. In the example of FIG. 3, scope card 334 is shown with two channels for signals 12 and 14, representing outputs from MR1 and MR2, respectively. Scope card 334 can handle AC signal measurements, such as noise measurements from MR1 and MR2. The measurements are provided to a separate processing unit (e.g., a second processing unit 106 in FIG. 1), which may be shared with other sliders for performing AC measurements that may involve extensive calculations.

For resistances measured from MR1 and MR2, each of DACs 338 can provide a respective read offset to sense circuits 330 to subtract out a low-level or background resistance when there is no magnetic field applied by the test system. Since each reader may have a different background resistance, these values are provided by two different DACs 338 for parallel testing of both MR1 and MR2. The background resistance and control of DACs 338 can be provided by the same processing unit that handles the DC measurements for the slider.

The DC measurements provided by sense circuits 330 can include, for example, resistance, voltage, and/or current measurements taken from each element under different conditions, such as at different temperatures or when a magnetic field is applied to the slider. The analysis and calculations performed by the first processing unit may be used to identify defective slider elements or for calibrating slider elements. For example, the DC measurements can be used to determine a bias voltage or bias current for the element during operation in the field. In addition, the first processing units may perform tests such as determining a transfer curve or a kink test where abrupt changes or non-linearity of voltage or current is detected across a varying magnetic field strength, such as a field ramp. In other tests or measurements, a difference between the resistance, current, or voltage of two elements of the slider may be measured. For example, a Rshunt value may be measured for the difference in resistance between MR1 and MR2.

Another example of a test that may be performed by a first processing unit can include an amplitude measurement for a magnetic field read by MR1 or MR2. A low amplitude (e.g., below a threshold amplitude) of a signal received from an MR read element exposed to a magnetic field can indicate that the MR read element is not sufficiently sensitive to be used to reliably read data from a disk. For example, an MR read element that produces a low amplitude signal can be more susceptible to noise or other interference to the intended signal.

The AC measurements provided by preamplifier 332 can include, for example, noise measurements over time, such as noise measurements under different magnetic fields, at different readback frequencies, or at different temperatures. In addition, SSN may also be measured when different elements of the slider are activated, such as the TFC element. As noted above, such noise measurements can involve a large number of data points taken at a high sampling rate by scope card 334, and provided to a separate second processing unit for analyzing or performing calculations based on the sampled data points. The analysis and calculations performed by the second processing unit may be used to identify defective slider elements or for calibrating slider elements.

Figure 4:
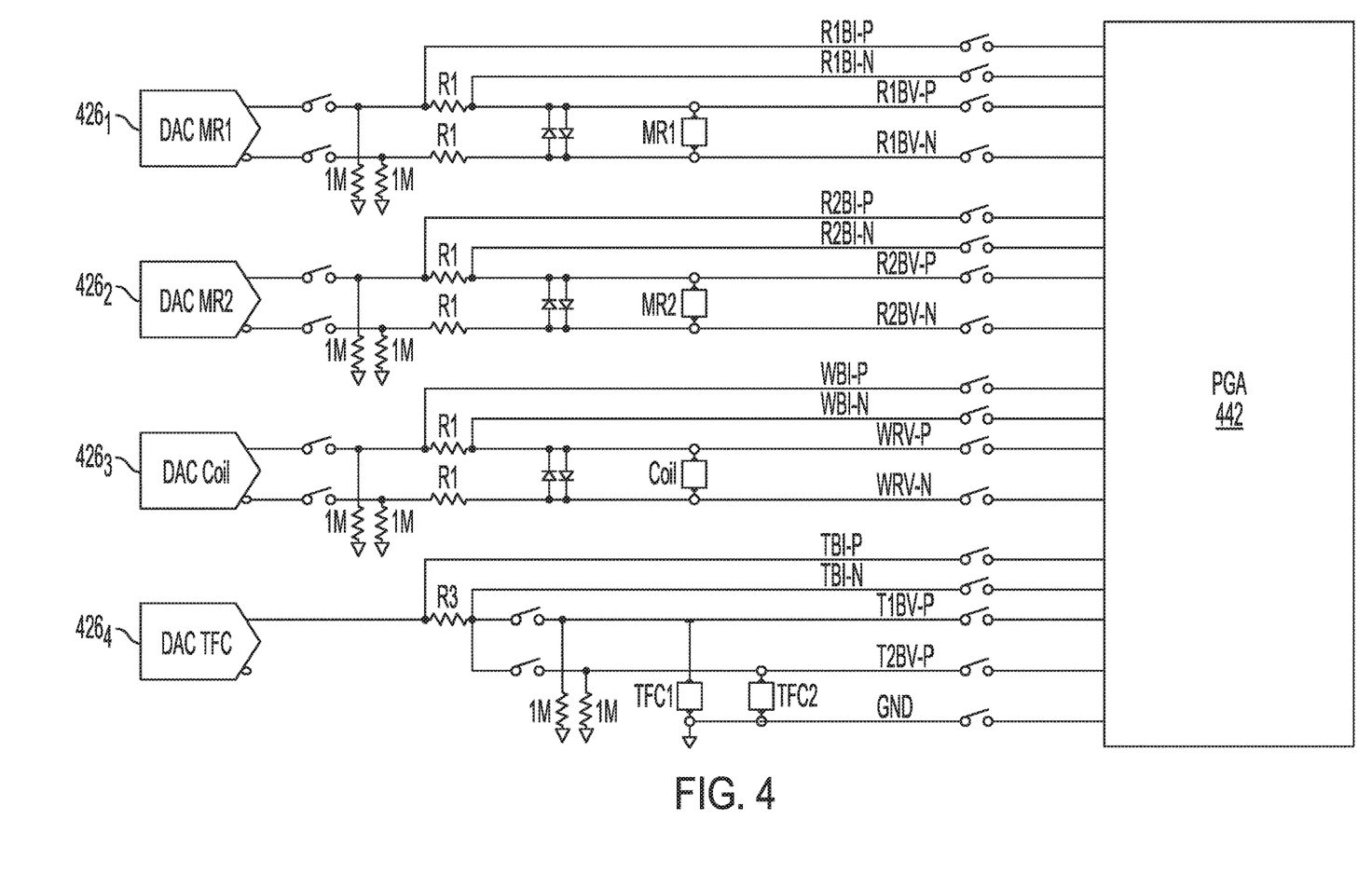
FIG. 4 is an example circuit diagram used in a magnetic recording slider test system according to an embodiment.
Figure 5:
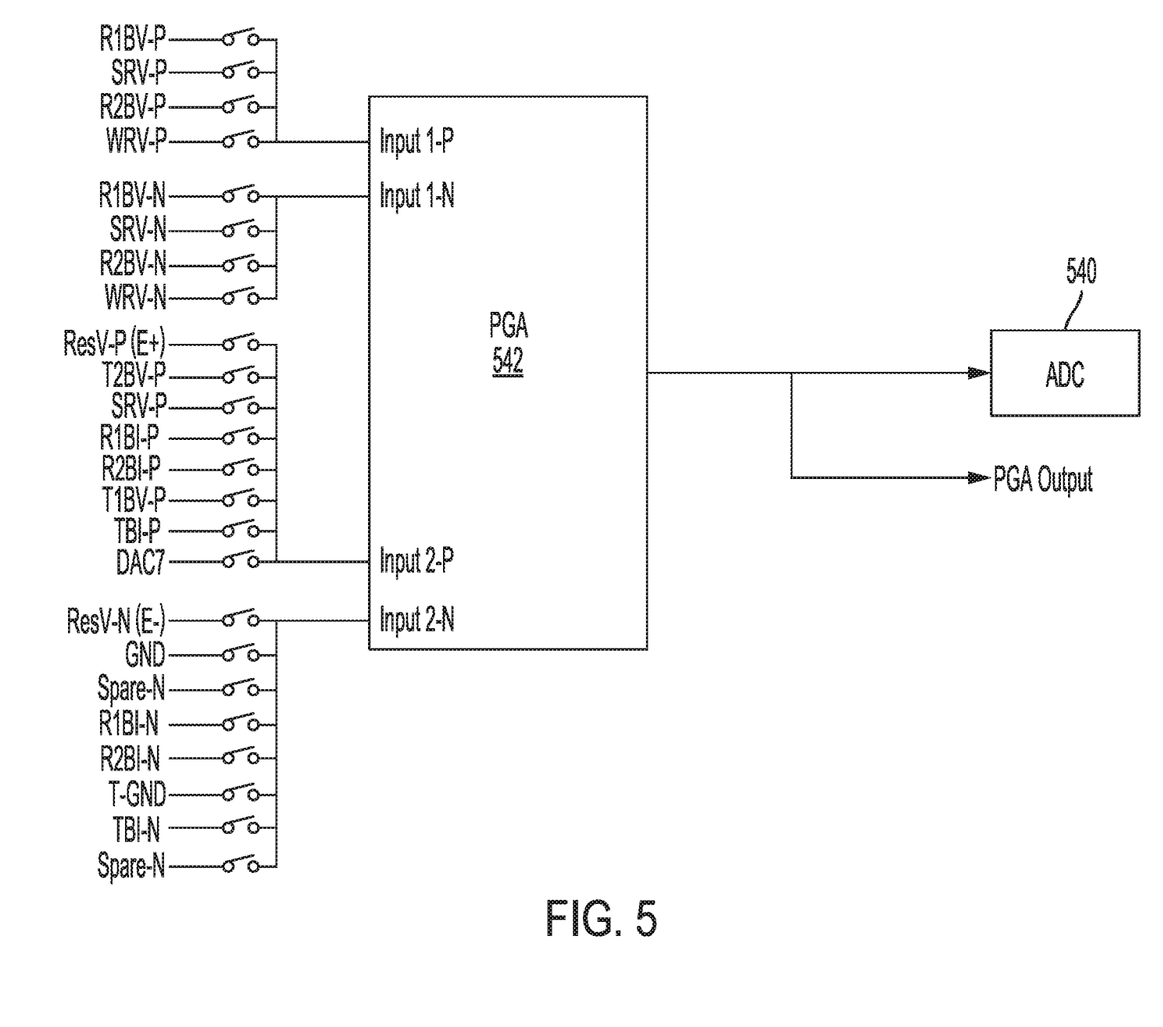
FIG. 5 is an example of inputs provided to one Analog to Digital Converter (ADC) in a magnetic recording slider test system according to an embodiment.

FIGS. 4 and 5 provide example circuit diagrams for bias circuits 328 and sense circuits 330 according to an embodiment. As shown in FIG. 4, five elements of a slider are tested, including MR1, MR2, a write coil, TFC1, and TFC2. The slider tested in the example of FIG. 4 includes two stages of heat provided by TFC elements TFC1 and TFC2, respectively, for decreasing the distance between the slider and a disk surface in the field using thermal expansion of the slider.

DACs $426_1$, $426_2$, and $426_3$ provide a bias control, such as a bias voltage, from a processing unit (not shown) to bias elements MR1, MR2, and the coil. DAC $426_4$ provides a bias control or bias voltage to bias one of TFC1 and TFC2 at a given time using resistor R3 depending on the position of the switches between these elements and DAC $426_4$. In this regard, the switches in the bias circuit for TFC1 and TFC2 can operate in sequence to bias each of TFC1 and TFC2 in a particular order. In other implementations, other elements may similarly share an ADC, such as, for example, two ECS elements or two IVC elements.

The outputs or responses from the elements are provided to Programmable Gain Amplifier (PGA) 442 as part of sense circuitry (e.g., sense circuits 330 in FIG. 3). In the case of MR1 and MR2, reader bias voltages R1BV and R2BV and reader bias currents R1BI and R2BI are provided to PGA 442 via switches. In the case of the write coil element, write coil bias voltage WRV and write coil bias current WBI are provided to PGA 442 via switches. In the case of TFC1 and TFC2, TFC bias current TBI and TFC bias voltages T1BV and T2BV are provided to PGA 442 via switches.

As will be appreciated by those of ordinary skill in the art, other circuitry or a different circuit arrangement can be used to determine measurements of the elements of a slider (e.g., bias currents and voltages). In addition, other sliders may include different elements or a different number of elements than those shown in the example of FIG. 4. The example of FIG. 4 provides a portion of a test system for testing a single slider. Other portions of the test system may be used to concurrently test other slider elements.

FIG. 5 is an example of inputs provided to one ADC in a magnetic recording slider test system according to an embodiment. As shown in FIG. 5, PGA 542 is configured to receive two different inputs (i.e., Input 1 and Input 2 in FIG. 5) that are selectively provided using switches, such as from a MUX. In more detail, four different signals or responses share input 1 and eight different signals or responses share input 2 in the example of FIG. 5. Input 1 selectively receives bias voltages from a first MR reader element (R1BV), a second MR reader element (R2BV), an STO element (SRV), and a write coil element (WRV).

Input 2, on the other hand, selectively receives a resistance voltage (ResV), bias voltages for TFC1 and TFC2 elements (T1BV and T2BV), a bias voltage for an STO element (SRV), a bias current for TFC elements (TBI), and an input from a DAC, which can include, for example, a read offset voltage as described above with respect to DACs 338 in FIG. 3.

The output of PGA 542 is provided to ADC 540, which is connected to a processing unit (not shown) for analyzing the PGA output or performing calculations based on the PGA output. In addition, the PGA output may also be provided to other circuitry, such as additional sense circuitry for providing, for example, a feedback signal.

As will be appreciated by those of ordinary skill in the art, the circuitry of FIG. 5 is provided as an example of inputs and components that may be used for measuring different responses of elements in a slider. Other measurements and arrangements may be used in different implementations. In addition, the arrangement of FIG. 5 provides a portion of the sense circuitry in that other PGAs may be used with the inputs or different inputs in the same test system for the same slider and/or for additional sliders that are concurrently tested.

Example Processes

Figure 6:
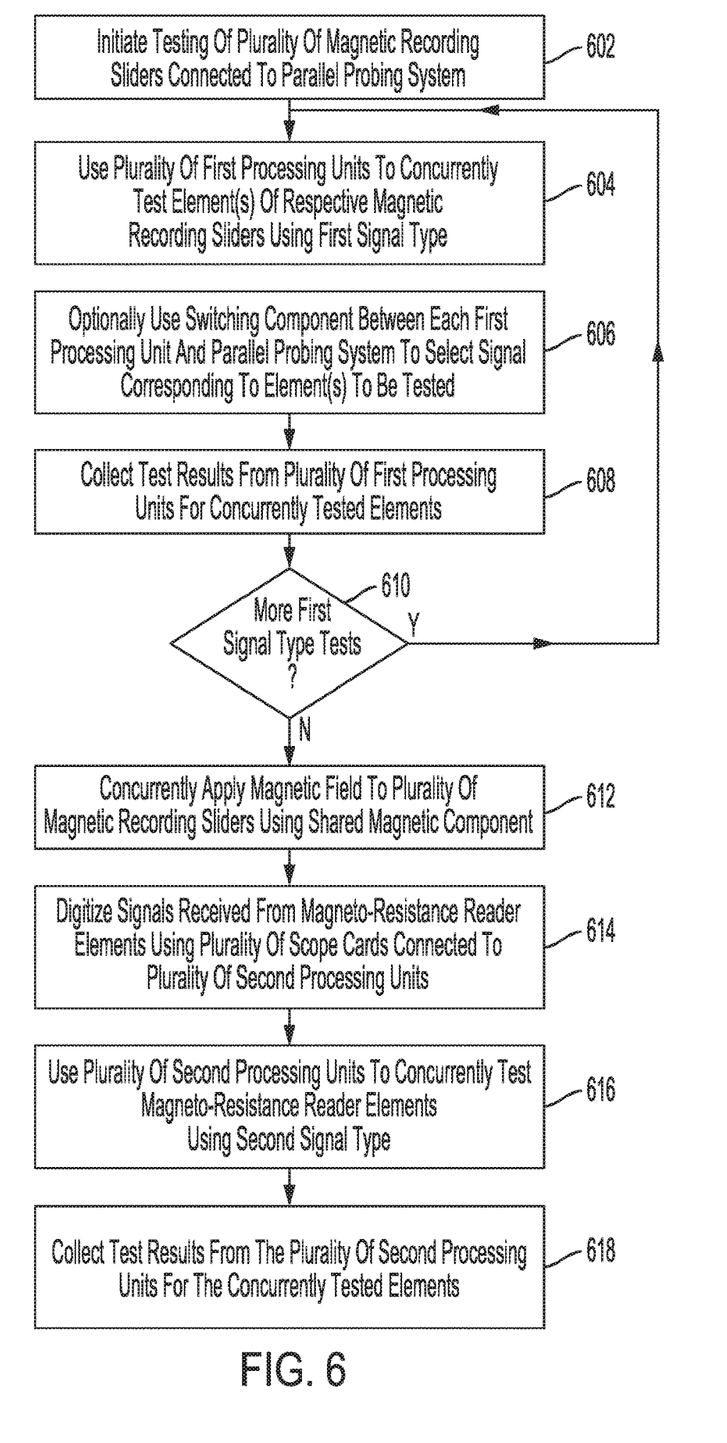
FIG. 6 is a flowchart for a magnetic recording slider test process performed by a magnetic recording slider test system according to an embodiment.

FIG. 6 is a flowchart for a magnetic recording slider test process performed by a magnetic recording slider test system according to an embodiment. In block 602, testing is initiated for a plurality of magnetic recording sliders connected to a parallel probing system (e.g., parallel probing system 112 in FIG. 1 or parallel probing system 212 in FIG. 2). The initiation of testing may be performed by a host of the testing system, such as with host 101 in FIG. 1 or host 202 in FIG. 2. The sequence of testing may be determined by the host executing a testing module at a processor of the host. As noted above, the host may also facilitate or control the loading of the plurality of sliders into the parallel probing system.

In block 604, a first plurality of processing units is used to concurrently test one or more elements of respective magnetic recording sliders using a first signal type. The first signal type can include, for example, DC signals, as opposed to AC signals used for different tests. For example, such DC signals of the first signal type can be used for determining a voltage bias of an element, a current bias of an element, a resistance difference between MR reader elements (e.g., Rshunt), a voltage bias for the slider body, or other analysis such as an amplitude measurement, asymmetry measurement, transfer curve, and/or kink for responses measured from an MR reader element under different magnetic fields.

In block 606, a switching component is optionally used to select a signal corresponding to the element or elements of each slider to be tested. As discussed above with reference to the examples of FIGS. 3 to 5, switching components can advantageously allow for the sharing of sense circuitry such as amplifiers (e.g., PGAs) and ADCs. The switching components can include, for example, multiplexers or analog switches.

In block 608, test results are collected from a plurality of first processing units for the concurrently tested elements. The first processing units can include, for example, at least one of SBCs and FPGAs. The test results can be from analysis or calculations performed by the first processing units, such as the comparison of one or more measurements to a threshold value or statistical analysis performed on a plurality of measurements represented by the first signal type (e.g., DC signals). For example, a histogram of the test results may be created, whereby statistical values such as an average (e.g., mean or first moment), minimum, maximum, range (e.g., difference between a maximum and a minimum), sigma (e.g., standard deviation or second moment), skewness (e.g., third moment), kurtosis (e.g., fourth moment), and/or other statistical values known in the art.

The host in block 608 may designate a status of slider elements or of the slider based on the collected test results. In such implementations, the status may indicate whether the slider element or slider passed or failed a test, has been rejected, or is marked for repurposing or replacement depending on the desired implementation. In addition to designating a status of the tested slider elements, the collected test results may be saved, such as for process feedback and achieving further improvements. In some cases, storing information pertaining to tested slider elements can allow the information to be recalled and compared to a current condition of the same or a different slider element.

In block 610, the host determines whether there are more tests for the first signal type (e.g., DC signal tests) to be performed for one or more elements of the plurality of sliders. If so, the process returns to block 604 to again use one or more of the first processing units to test an element of a respective slider using a first signal of the first signal type. In some cases, the host may determine that there are more tests of the first signal type to be performed when one or more elements need to be retested to perform different statistical calculations or to double check a first evaluation, or in cases of an unsuccessful first evaluation.

If it is determined in block 610 that there are no more first signal type tests to be performed, the process of FIG. 6 continues to block 612 to concurrently apply a magnetic field to the plurality of sliders using a shared magnetic component. The magnetic field may be applied, for example, by a magnetic controller of the test system (e.g., magnetic controller 224 in FIG. 2). Blocks 612 to 618 can represent a second portion of the concurrent testing of slider elements for tests involving a second type of signal. In some implementations, the second portion can include testing using AC signals as compared to DC signals used in the first portion of testing. Such AC signals may be used for noise measurements from responses received from the MR reader elements. The noise measurements can include, for example, noise measurements for SNR and reader instability characterization, such as SSN and the variation in noise over time under different conditions. These measurements may be taken at different temperature conditions, readback frequencies, and/or magnetic field strengths.

In block 614, analog signals received from the MR reader elements are digitized using a plurality of scope cards (e.g., scope card 334 in FIG. 3) connected to a plurality of second processing units for testing and analysis of the digitized signals. In some implementations, each scope card may receive analog AC signals from multiple MR reader elements that are provided to respective channels of the scope card. The analog signals may also first be amplified using, for example, a preamplifier (e.g., preamplifier 332 in FIG. 3). The scope cards are able to provide high sampling rates of the analog signals to provide signals to the plurality of second processing units for numerous data points.

In block 616, the plurality of second processing units is used to concurrently test MR reader elements from different sliders using the signals of the second type (e.g., AC signals). The plurality of second processing units can include, for example, one or more SBCs and/or one or more FPGAs. As noted above, AC measurements can generate numerous data points over a period of time and/or under different test conditions. The analysis of this data can be performed by the dedicated second processing units, rather than by a host as in conventional test systems. This ordinarily improves the scalability and testing time for testing a plurality of sliders since the analysis of numerous data points can be time intensive or consume a significant amount of processing resources.

For example, some testing can involve statistical measurements, such as a standard deviation over a period time with millions of data points. As another example, a histogram of noise measurements may be compared to a Gaussian distribution for different magnetic field strengths to identify defective MR reader elements. In yet other examples, a standard deviation of a given segment of sampled noise values may be determined by calculating the square root of the average of the squared deviations of the segment of sampled noise values from their average value.

In some approaches, sampled noise values acquired for an MR reader element exposed to a magnetic field may be divided by the second processing units into segments and a sigma value calculated by the second processing units for each of the segments. Statistics, such as a rolling or moving average of the sigma values corresponding to two or more segments of sampled noise values may be calculated by the second processing units to determine whether at least some of the sigma values and/or results of the statistical calculations are within a range. Examples of such testing of sliders for noise can be found in U.S. application Ser. No. 15/058,036, entitled "SYSTEMS AND METHODS FOR DETECTING UNSTABLE READ HEADS" and filed on Mar. 1, 2016, the entire contents of which are hereby incorporated by reference.

In block 618, test results are collected from the plurality of second processing units for the concurrently tested elements in block 616. The test results can result from analysis or calculations performed by the second processing units, such as the comparison of one or more measurements to a threshold value or statistical analysis performed on a plurality of measurements represented by the second signal, such as an average amplitude or standard deviation. As with block 608 described above for testing using the first signal type, the host in block 618 may designate a status of slider elements based on the collected test results (e.g., pass, fail, repurpose, replace, etc.). The collected test results may also be saved by the host, such as for process feedback and achieving further improvements.

In some implementations, the host may determine whether there are more high tests of the second signal type (e.g., AC signal testing) to be performed, such as for different slider elements or if testing of an element needs to be repeated. In such implementations, the process may return to block 612 to again use one or more second processing units to test an element of respective sliders using a signal of the second signal type.

As will be appreciated by those of ordinary skill in the art, the order of performing the first signal type tests and the second signal type tests in FIG. 6 can be reversed in other implementations. For example, blocks 612 to 618 for second signal type testing may occur before blocks 604 to 608 for first signal type testing. In addition, other implementations may intersperse first signal type tests with second signal type tests.

Figure 7:
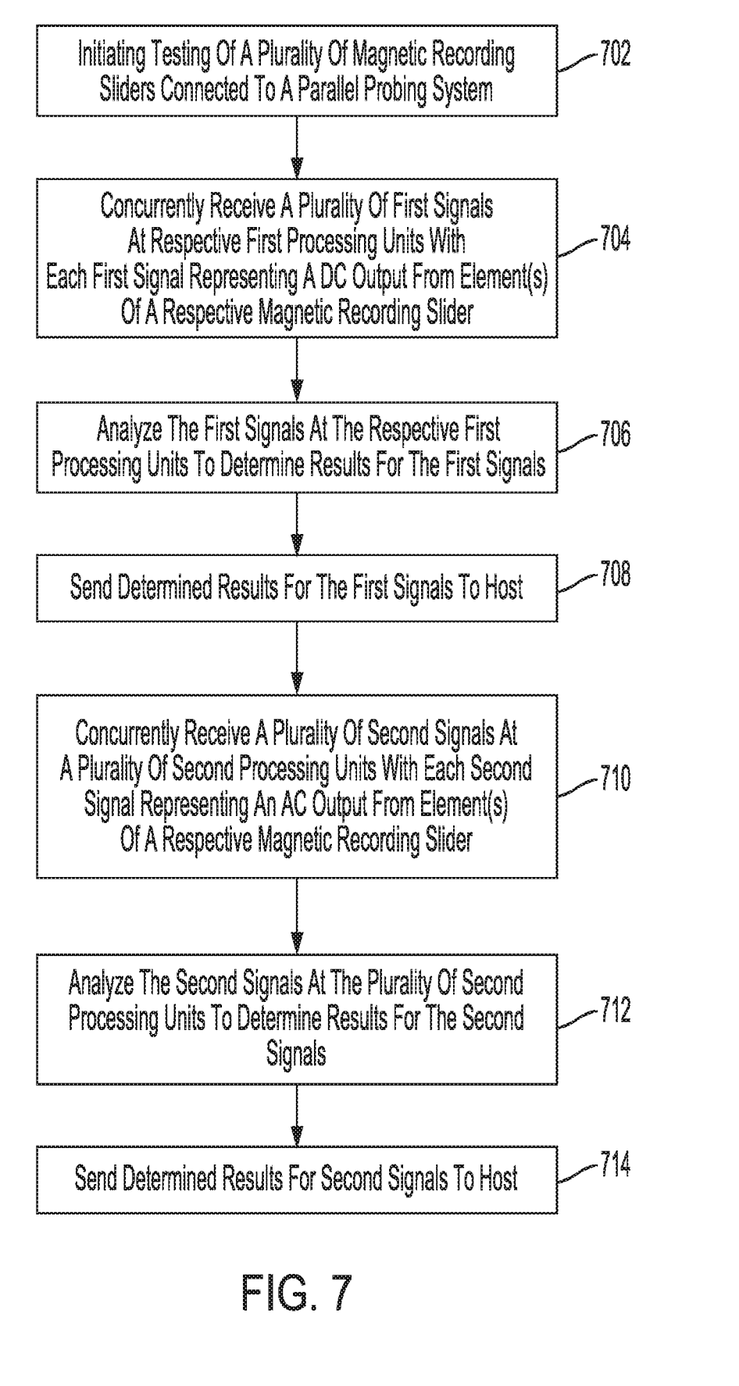
FIG. 7 is a flowchart for a magnetic recording slider test process using a plurality of first processing units and a plurality of second processing units according to an embodiment.

FIG. 7 is a flowchart for a magnetic recording slider test process using a plurality of processing units according to an embodiment. In block 702, testing is initiated for a plurality of magnetic recording sliders connected to a parallel probing system (e.g., parallel probing system 112 in FIG. 1 or parallel probing system 212 in FIG. 2). The initiation of testing may be performed by a host of the testing system, such as with host 101 in FIG. 1 or host 202 in FIG. 2. The sequence of testing may be determined by the host executing a testing module at a processor of the host. As noted above, the host may also facilitate or control the loading of the plurality of sliders into the parallel probing system.

In block 704, a plurality of first signals is received at respective first processing units with each first signal representing a DC output from one or more elements of a respective magnetic recording slider. The first processing units can include, for example, one or more SBCs and/or one or more FPGAs. The first signal may represent, for example, a voltage bias of an element, a current bias of an element, a resistance difference between MR reader elements (e.g., Rshunt), or a resistance for one or more elements of the slider.

In block 706, the first signals are analyzed at respective first processing units to determine results for the first signals. In some cases, the results can include a determination of a bias voltage or bias current, or may include a value of an amplitude, amount of asymmetry in a response, a transfer curve, an amount of kink, a comparison to a threshold value, or a statistical result determined from the first signal.

In block 708, the determined results for the first signals are sent to the host (e.g., host 102 in FIG. 1 or host 202 in FIG. 2). The host may then display the results and/or store the results. In some cases, the host may indicate whether a particular element has passed or failed a test.

In block 710, a plurality of second signals is concurrently received at a plurality of second processing units with each second signal representing an AC output from one or more elements of a respective magnetic recording slider. The plurality of second processing units can include, for example, one or more SBCs and/or one or more FPGAs. As noted above, AC measurements can generate numerous data points over a period of time and/or under different test conditions.

In block 712, the second signals are analyzed at the plurality of second processing units to determine results for the second signals. The analysis of the second signals can include, for example, comparison to a threshold value or a statistical analysis or other algorithm performed by the second processing unit.

In block 714, the results determined in block 712 for the second signals are sent to the host. The host may then display the results and/or store the results. In some cases, the host may indicate whether a particular element has passed or failed the test.

As will be appreciated by those of ordinary skill in the art, the order of performing the DC signal tests and AC signal tests in FIG. 7 can be reversed in other implementations. For example, blocks 712 to 714 for AC signal testing may occur before blocks 704 to 708 for DC signal testing. In addition, other implementations may intersperse DC signal tests with AC signal tests.

As discussed above, the foregoing use of dedicated processing units for parallel testing of magnetic recording sliders can ordinarily improve the processing capability and reduce the time for concurrently testing sliders that include multiple elements. In addition, such test systems are scalable to allow for large numbers of sliders to be tested, such as an entire row bar of sliders to improve the efficiency of the testing process.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or control circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, and modules described in connection with the examples disclosed herein may be implemented or performed with a processor or control circuitry, such as, for example, a Central Processing Unit (CPU), a Microprocessor Unit (MPU), a Microcontroller Unit (MCU), or a DSP, and can include, for example, an FPGA, an ASIC, or other programmable logic device, discrete gate or transistor logic, discrete hardware components, or any combination thereof designed to perform the functions described herein. A processor or control circuitry may also be implemented as a combination of computing devices, e.g., a combination of a DSP and an MPU, a plurality of MPUs, one or more MPUs in conjunction with a DSP core, or any other such configuration. In some implementations, the control circuitry or processor may form at least part of an SoC.

The activities of a method or process described in connection with the examples disclosed herein may be embodied directly in hardware, in a software module executed by a processor or control circuitry, or in a combination of hardware and software. The steps of the method or algorithm may also be performed in an alternate order from those provided in the examples. A software module may reside in RAM memory, flash memory, ROM memory, EPROM memory, EEPROM memory, other types of solid state memory, registers, hard disk, removable media, optical media, or any other form of storage medium known in the art. An exemplary storage medium is coupled to a processor or a controller such that the processor or control circuitry can read information from, and write information to, the storage medium. In the alternative, the storage medium may be integral to the processor or the control circuitry.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive.

What is claimed is:

1. A magnetic recording slider test system, comprising:
   a host configured to collect test results and initiate concurrent testing of a plurality of magnetic recording sliders;
   a parallel probing system for connecting the plurality of magnetic recording sliders to the magnetic recording slider test system for parallel testing of the plurality of magnetic recording sliders; and
   a plurality of first processing units connected to the host, wherein each first processing unit of the plurality of first processing units is configured to test at least one element of a respective magnetic recording slider of the plurality of magnetic recording sliders, and
   wherein the plurality of first processing units includes at least one of Single Board Computers (SBCs) and Field-Programmable Gate Arrays (FPGAs).

2. The magnetic recording slider test system of claim 1, further comprising a plurality of second processing units connected to the host and configured to analyze second signals with each second signal representing an Alternating Current (AC) output from one or more elements of a respective magnetic recording slider, and wherein the plurality of first processing units is further configured to analyze first signals with each first signal representing a Direct Current (DC) output from one or more elements of a respective magnetic recording slider.

3. The magnetic recording slider test system of claim 2, wherein the plurality of second processing units is configured to analyze noise responses from multiple magnetic recording sliders of the plurality of magnetic recording sliders.

4. The magnetic recording slider test system of claim 2, further comprising a plurality of scope cards, wherein each scope card of the plurality of scope cards is connected to a respective second processing unit of the plurality of second processing units.

5. The magnetic recording slider test system of claim 1, wherein each first processing unit of the plurality of first processing units is configured to test at least one of a magneto-resistance read element, a write coil element, a thermal fly-height control element, a spin torque oscillator element, an interface voltage control element, an embedded contact sensor element, and a laser element of the respective magnetic recording slider.

6. The magnetic recording slider test system of claim 5, further comprising a switching component between each first processing unit of the plurality of first processing units and the parallel probing system, the switching component configured to select a signal corresponding to an element of the respective magnetic recording slider to be tested by the first processing unit of the plurality of first processing units.

7. The magnetic recording slider test system of claim 1, further comprising a Local Area Network (LAN) configured to provide network communication between the host and each first processing unit of the plurality of first processing units.

8. The magnetic recording slider test system of claim 1, further comprising a shared magnetic component for concurrently applying a magnetic field to the plurality of magnetic recording sliders.

9. A method of testing magnetic recording sliders, the method comprising:
   initiating testing of a plurality of magnetic recording sliders connected to a parallel probing system;
   using a plurality of first processing units to concurrently test at least one element of respective magnetic recording sliders of the plurality of magnetic recording sliders, wherein the plurality of first processing units includes at least one of Single Board Computers (SBCs) and Field-Programmable Gate Arrays (FPGAs); and
   collecting test results from the plurality of first processing units for the concurrently tested elements of the plurality of magnetic recording sliders.

10. The method of claim 9, further comprising:
    analyzing second signals representing Alternating Current (AC) outputs from the plurality of magnetic recording sliders using a plurality of second processing units; and
    analyzing first signals representing Direct Current (DC) outputs from the plurality of magnetic recording sliders using the plurality of first processing units.

11. The method of claim 10, further comprising using the plurality of second processing units to analyze noise responses from multiple magnetic recording sliders of the plurality of magnetic recording sliders.

12. The method of claim 10, further comprising digitizing signals received from a plurality of magneto-resistance reader elements of the plurality of magnetic recording sliders using a plurality of scope cards connected to the plurality of second processing units, wherein each second processing unit of the plurality of second processing units receives digitized signals representing AC outputs from magneto-resistance reader elements of multiple magnetic recording sliders of the plurality of magnetic recording sliders.

13. The method of claim 9, further comprising using each first processing unit of the plurality of first processing units to test at least one of a magneto-resistance read element, a write coil element, a thermal fly-height control element, a spin torque oscillator element, an interface voltage control element, an embedded contact sensor element, and a laser element of the respective magnetic recording slider.

14. The method of claim 9, further comprising using a switching component between each first processing unit of the plurality of first processing units and the parallel probing system to select a signal corresponding to an element of the respective magnetic recording slider to be tested by the first processing unit.

15. The method of claim 9, wherein initiating testing of the plurality of magnetic recording sliders and collecting test results from the plurality of first processing units is provided via a Local Area Network (LAN) configured to provide network communication between a host and each first processing unit of the plurality of first processing units.

16. The method of claim 9, further comprising concurrently applying a magnetic field to the plurality of magnetic recording sliders using a shared magnetic component.

17. A method of testing magnetic recording sliders, the method comprising:
   initiating testing of a plurality of magnetic recording sliders connected to a parallel probing system;
   concurrently receiving a plurality of first signals at respective first processing units, wherein each of the first signals of the plurality of first signals represents an output from one or more elements of a respective magnetic recording slider of the plurality of magnetic recording sliders;
   analyzing the received plurality of first signals at the respective first processing units to determine results for the plurality of first signals;
   sending the determined results for the plurality of first signals to a host;
   concurrently receiving a plurality of second signals at a plurality of second processing units, wherein each of the second signals of the plurality of second signals represents an Alternating Current (AC) output from one or more elements of a respective magnetic recording slider;
   analyzing the received plurality of second signals at the plurality of second processing units to determine results for the plurality of second signals; and
   sending the determined results for the plurality of second signals to the host.

18. The method of claim 17, wherein the plurality of second signals represents noise responses from the plurality of magnetic recording sliders.

19. A magnetic recording slider test system, comprising:
   a host configured to collect test results and initiate concurrent testing of a plurality of magnetic recording sliders;
   a parallel probing system for connecting the plurality of magnetic recording sliders to the magnetic recording slider test system for parallel testing of the plurality of magnetic recording sliders;
   a plurality of first processing units connected to the host, wherein each first processing unit of the plurality of first processing units is configured to test at least one element of a respective magnetic recording slider of the plurality of magnetic recording sliders, and wherein the plurality of first processing units is further configured to analyze first signals with each first signal representing a Direct Current (DC) output from one or more elements of a respective magnetic recording slider; and
   a plurality of second processing units connected to the host and configured to analyze second signals with each second signal representing an Alternating Current (AC) output from one or more elements of a respective magnetic recording slider.

20. The magnetic recording slider test system of claim 19, wherein the plurality of second processing units is configured to analyze noise responses from multiple magnetic recording sliders of the plurality of magnetic recording sliders.

21. The magnetic recording slider test system of claim 19, further comprising a plurality of scope cards, wherein each scope card of the plurality of scope cards is connected to a respective second processing unit of the plurality of second processing units.

22. A method of testing magnetic recording sliders, the method comprising:
   initiating testing of a plurality of magnetic recording sliders connected to a parallel probing system;
   using a plurality of first processing units to concurrently test at least one element of respective magnetic recording sliders of the plurality of magnetic recording sliders;
   analyzing first signals representing Direct Current (DC) outputs from the plurality of magnetic recording sliders using the plurality of first processing units;
   collecting test results from the plurality of first processing units for the concurrently tested elements of the plurality of magnetic recording sliders; and
   analyzing second signals representing Alternating Current (AC) outputs from the plurality of magnetic recording sliders using a plurality of second processing units.

23. The method of claim 22, further comprising using the plurality of second processing units to analyze noise responses from multiple magnetic recording sliders of the plurality of magnetic recording sliders.

24. The method of claim 22, further comprising digitizing signals received from a plurality of magneto-resistance reader elements of the plurality of magnetic recording sliders using a plurality of scope cards connected to the plurality of second processing units, wherein each second processing unit of the plurality of second processing units receives digitized signals representing AC outputs from magneto-resistance reader elements of multiple magnetic recording sliders of the plurality of magnetic recording sliders.

* * * * *